(12) United States Patent
Tsung

(10) Patent No.: US 6,964,629 B2
(45) Date of Patent: Nov. 15, 2005

(54) DIFFERENTIAL GEARS WITH OPTIMIZED NUMBER OF TEETH

(75) Inventor: Wei-Jiung Tsung, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 646 days.

(21) Appl. No.: 09/870,770

(22) Filed: Jun. 1, 2001

(65) Prior Publication Data

US 2002/0183158 A1 Dec. 5, 2002

(51) Int. Cl.[7] .............................................. F16H 48/06
(52) U.S. Cl. ......................................................... 475/230
(58) Field of Search ................................... 475/230, 220, 475/904; 74/423, 424, 459.5

(56) References Cited

U.S. PATENT DOCUMENTS

| 2,009,915 A | 7/1935 | Davis |
| 3,703,108 A | 11/1972 | McCaw |
| 4,244,243 A | 1/1981 | McCaw |
| 4,754,661 A | * 7/1988 | Barnett ........................ 475/236 |
| 4,967,861 A | 11/1990 | Oyama |

* cited by examiner

*Primary Examiner*—Dirk Wright
(74) *Attorney, Agent, or Firm*—Berenato, White & Stavish

(57) ABSTRACT

The differential assembly includes a rotatable differential case, a pair of side gears rotatably mounted within the differential case, and a set of spaced apart differential pinion mate gears rotatably supported by a pinion shaft and drivingly engaging said side gears to allow differential rotation therebetween. A sum of a number of teeth of any one of the side gears and a number of teeth of any one of the pinion mate gears is no greater than nineteen, a difference between the number of teeth of any one of the side gears and the number of teeth of any one of the pinion mate gears is no greater than three, and the number of teeth of any one of the side gears and the number of teeth of any one of the pinion mate gears each is no greater than eleven.

9 Claims, 1 Drawing Sheet

DIFFERENTIAL GEARS WITH OPTIMIZED NUMBER OF TEETH

BACKGROUND OF THE INVENTION

1. Field of the Invention

The present invention relates to a differential assembly, and more particularly to a differential assembly having a number of teeth of side gears and a number of teeth of pinion mate gears optimized for improving gear power density and reducing size.

2. Description of the Prior Art

Conventionally, differential assemblies, well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. A conventional differential assembly comprises a rotatable differential case housing a pair of opposite side gears in meshing engagement with a set of pinion mate gears to permit differential rotation thereof.

Typically, a sum of a number of teeth of any one of differential side gears $Z_1$ and a number of teeth of any one of pinion mate gears $Z_2$ is more than nineteen. Usually differential assembly manufacturers employ the following combinations of the number of teeth of the differential side gear and the number of teeth of the pinion mate gear: 14×10, 16×10 or 13×9. Moreover, it is noticeable that a difference between the number of teeth of the side gears and the number of teeth of the pinion mate gears in each of the above combinations is greater than three, and the number of teeth of the side gears above each is greater than eleven.

At present, the differential side gears and the pinion mate gears are subject of contradictory requirements for increasing a gear strength and reducing their size due to ever increasing vehicle engine power and gear loads, and the necessity to reduce weight and size of the unsprung masses of the motor vehicles. The existing differential gears do not satisfy current requirements for gear tooth strength and the gear size.

Thus, there is a need for a combination of the differential side gear and the meshing pinion mate gear having optimized numbers of teeth providing improved power density and reduced size.

SUMMARY OF THE INVENTION

The present invention provides a differential assembly including a differential gearing, i.e. a differential side gear and a meshing pinion mate gear, having an optimized number of teeth providing improved power density and reduced size.

The differential assembly in accordance with the present invention includes a rotatable differential case, a pair of side gears rotatably mounted within the differential case, and a set of spaced apart differential pinion mate gears rotatably supported by a pinion shaft and drivingly engaging said side gears to allow differential rotation therebetween, wherein a sum of a number of teeth of any one of the side gears and a number of teeth of any one of the pinion mate gears is less than nineteen, a difference between the number of teeth of any one of the side gears and the number of teeth of any one of the pinion mate gears is no greater than three, and the number of teeth of any one of the side gears and the number of teeth of any one of the pinion mate gears each is no greater than eleven.

The differential assembly in accordance with the present invention provides substantially improved gear power density that allows transmitting higher torque from a drive shaft, and reduced size of its components.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
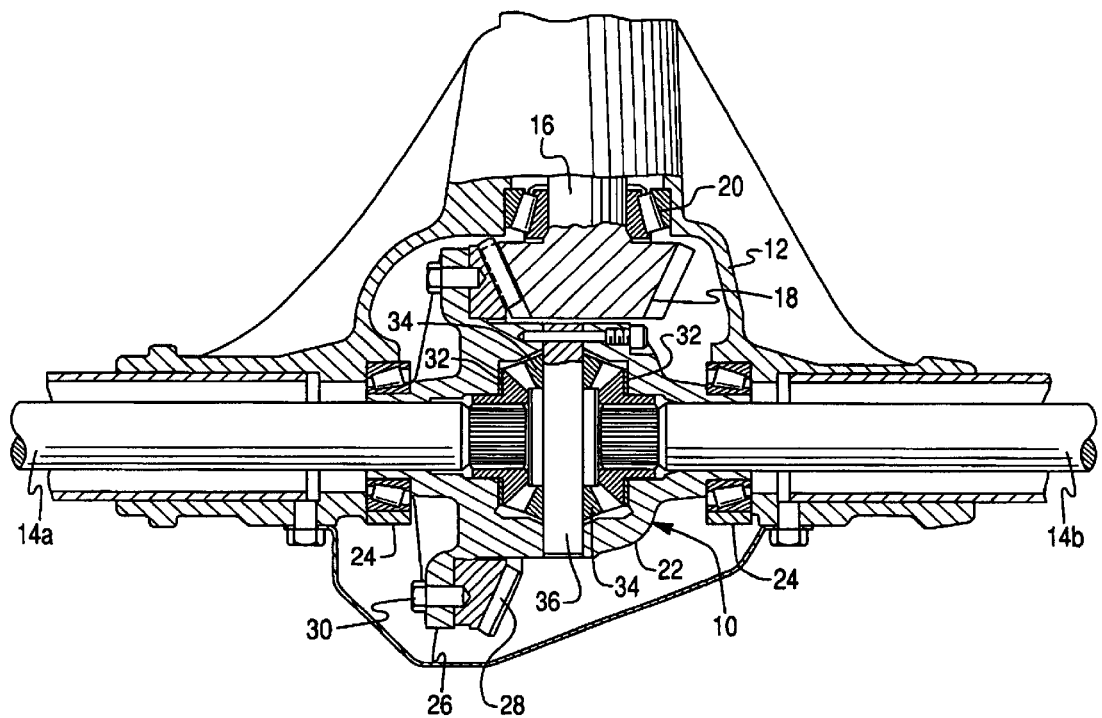
FIG. 1 is a partial cross-sectional view of an exemplary differential assembly for a motor vehicle.

The preferred embodiment of the present invention will now be described with the reference to accompanying drawing.

Referring now to FIG. 1 of the drawings, a typical differential assembly for a motor vehicle, generally designated by the reference numeral 10, is illustrated. The differential assembly 10 is incased in an axle housing 12, and is adapted to differentially drive a pair of aligned axle shafts 14a and 14b projecting inwardly of the differential assembly 10 from the opposite directions and, in turn is driven by a drive shaft 16 provided with a drive gear 18 at one end thereof. The drive shaft 16 is mounted for rotation adjacent to the differential assembly 10 as by means of a bearing 20 in the axle housing 12.

The differential assembly 10 comprises a differential case 22 rotatably supported at opposite ends thereof by means of a pair of opposite tapered roller side bearings 24 in the axle housing 12. The differential case 22 has an annular flange 26 to which a ring gear 28 is fastened by any appropriate means, such as by bolts 30. The ring gear 28 meshes with the drive gear 18.

The differential case 22 houses a pair of opposite side gears 32 commonly splined to the axle shafts 14a and 14b for rotation therewith, and a set of pinion mate gears 34 rotatably supported on a transverse pinion shaft 36. The side gears 32 are in mesh with the pinion mate gears 34. The pinion shaft 36 is conventionally retained within the differential case 22 by a locking pin 38 extending through an opening in the pinion shaft 36.

Each of the side gears 32 has a first number of teeth $Z_1$, and each of the pinion mate gears 34 has a second number of teeth $Z_2$.

In accordance with the present invention, the differential gear teeth numbers $Z_1$ and $Z_2$ are selected in accordance with the following equations:

$$Z_1+Z_2 \leq 19, \qquad (1)$$

$$Z_1-Z_2 \leq 3, \qquad (2)$$

$$Z_1 \leq 11, \text{ and} \qquad (3)$$

$$Z_2 \leq 11. \qquad (4)$$

Preferably, the differential gear teeth numbers $Z_1$ and $Z_2$ are selected in accordance with the following equations:

$$Z_1+Z_2 < 19, \qquad (5)$$

$$Z_1-Z_2 \leq 3, \qquad (2)$$

$$Z_1 \leq 11, \text{ and} \qquad (3)$$

$$Z_2 \leq 11, \qquad (4)$$

Selecting the differential gear teeth numbers $Z_1$ and $Z_2$ in accordance on the equations (1)–(4) or (2)–(5) allows substantially increase gear power density and reduce size of differential components, such as the differential case 22. This assumption is based on the following theoretical premise.

It is well known to those skilled in the art that a pitch diameter D of a toothed gear is determined by the following formula:

$$D = m_n * Z; \tag{5}$$

wherein
- $m_n$ is a gear teeth normal module, and
- Z is a number of teeth of the gear.

It is well known to those of ordinary skill in the art gear strength is proportional to the normal module $m_n$.

From the formula (3) follows that the normal module is determined by the following equation:

$$m_n = D/Z. \tag{6}$$

As the equation (6) shows, at a given size of the pitch diameter D of the differential gears 32 and 34 dictated by the size of the differential case 22, the normal module $m_n$ may be increased only by reducing the gear teeth number Z in order to improve the gear strength. Thus, higher torque may be transmitted from the drive shaft 16 to the differential case 22 through the ring gear 28. Alternatively, if the power and load requirements of a vehicle transmission are not particularly demanding, it is possible, according to the equation (6), to reduce the size of the differential gears 32 and 34, and/or eliminate certain gear surface treatment processes, such as shot peening.

In the first exemplary embodiment of the present invention, the number of teeth of each of the side gears 32 is 11, while the number of teeth of each of the pinion mate gears 34 is 8. This arrangement satisfies all the equations (1)–(4):

$$11+8=19,$$

$$11-8=3,$$

$$10<11 \text{ and } 8<11.$$

In the second exemplary embodiment of the present invention, the number of teeth of each of the side gears 32 is 10, while the number of teeth of each of the pinion mate gears 34 is 7. This arrangement satisfies all the equations (2)–(5):

$$10+7=17<19,$$

$$10-7=3,$$

$$10<11 \text{ and } 7<11.$$

Alternatively, in accordance with the third exemplary embodiment of the present invention, the number of teeth of each of the side gears 32 is 9, while the number of teeth of each of the pinion mate gears 34 is 7. This arrangement also satisfies equations (2)–(5):

$$9+7=16<19,$$

$$9-7=2<3,$$

$$9<11 \text{ and } 7<11.$$

It will be appreciated that any other combination of the number of teeth of the side gear 32 and the number of teeth of the pinion mate gear 34 that satisfies equations (1) to (4), is within the scope of present invention.

Therefore, the differential assemblies including side gears and the pinion mate gears having an optimized number of teeth selected according to the present invention, have substantially improved gear power density that allows transmitting higher torque from the drive shaft, and reduced size of its components.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A differential assembly comprising:
   a rotatable differential case;
   a pair of side gears rotatably mounted within said differential case; and
   a set of spaced apart differential pinion mate gears rotatably supported by a pinion shaft and drivingly engaging said side gears to allow differential rotation therebetween;
   wherein a sum of a first number of teeth of any one of said side gears and a second number of teeth of any one of said pinion mate gears is less than nineteen.

2. The differential assembly as defined in claim 1, wherein a difference between said first number of teeth of any one of said side gears and said second number of teeth of any one of said pinion mate gears is no greater than three.

3. The differential assembly as defined in claim 2, wherein said first number of teeth of any one of said side gears and said second number of teeth of any one of said pinion mate gears each is no greater than eleven.

4. A differential assembly comprising:
   a rotatable differential case;
   a pair of side gears rotatably mounted within said differential case; and
   a set of spaced apart differential pinion mate gears rotatably supported by a pinion shaft and drivingly engaging said side gears to allow differential rotation therebetween;
   wherein a sum of a first number of teeth of any one of said side gears and a second number of teeth of any one of said pinion mate gears is less than nineteen, a difference between said first number of teeth of any one of said side gears and said second number of teeth of any one of said pinion mate gears is no greater than three, and said first number of teeth of any one of said side gears and said second number of teeth of any one of said pinion mate gears each is no greater than eleven.

5. A differential assembly comprising:
   a rotatable differential case;
   a pair of side gears rotatably mounted within said differential case; and
   a set of spaced apart differential pinion mate gears rotatably supported by a pinion shaft and drivingly engaging said side gears to allow differential rotation therebetween;
   wherein a sum of a first number of teeth of any one of said side gears and a second number of teeth of any one of said pinion mate gears is no greater than nineteen, and a difference between said first number of teeth of any one of said side gears and said second number of teeth of any one of said pinion mate gears is no greater than three.

6. The differential assembly as defined in claim 5, wherein said first number of teeth of any one of said side gears and said second number of teeth of any one of said pinion mate gears each is no greater than eleven.

7. A differential assembly comprising:

a rotatable differential case;

a pair of side gears rotatably mounted within said differential case; and a set of spaced apart differential pinion mate gears rotatably supported by a pinion shaft and drivingly engaging said side gears to allow differential rotation therebetween;

wherein a sum of a first number of teeth of any one of said side gears and a second number of teeth of any one of said pinion mate gears is no greater than nineteen, and said first number of teeth of any one of said side gears and said second number of teeth of any one of said pinion mate gears each is no greater than eleven.

8. The differential assembly as defined in claim 7, wherein a difference between said first number of teeth of any one of said side gears and said second number of teeth of any one of said pinion mate gears is no greater than three.

9. A differential assembly comprising:

a rotatable differential case;

a pair of side gears rotatably mounted within said differential case; and a set of spaced apart differential pinion mate gears rotatably supported by a pinion shaft and drivingly engaging said side gears to allow differential rotation therebetween;

wherein a sum of a first number of teeth of any one of said side gears and a second number of teeth of any one of said pinion mate gears is no greater than nineteen, a difference between said first number of teeth of any one of said side gears and said second number of teeth of any one of said pinion mate gears is no greater than three, and said first number of teeth of any one of said side gears and said second number of teeth of any one of said pinion mate gears each is no greater than eleven.

\* \* \* \* \*